US006927728B2

(12) United States Patent
Vook et al.

(10) Patent No.: US 6,927,728 B2
(45) Date of Patent: Aug. 9, 2005

(54) METHOD AND APPARATUS FOR MULTI-ANTENNA TRANSMISSION

(75) Inventors: Frederick W. Vook, Schaumburg, IL (US); Timothy A. Thomas, Palatine, IL (US); Xiangyang Zhuang, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 6 days.

(21) Appl. No.: 10/387,727

(22) Filed: Mar. 13, 2003

(65) Prior Publication Data

US 2004/0178954 A1 Sep. 16, 2004

(51) Int. Cl.$^7$ ............................. H01Q 3/00; H04B 7/02
(52) U.S. Cl. ...................................... 342/377; 375/267
(58) Field of Search ................................ 342/377, 383; 375/347, 267

(56) References Cited

U.S. PATENT DOCUMENTS

| | | | |
|---|---|---|---|
| 6,249,250 B1 | | 6/2001 | Namekata et al. |
| 6,362,781 B1 | | 3/2002 | Thomas et al. |
| 2002/0085653 A1 | * | 7/2002 | Matsuoka et al. .......... 375/347 |
| 2002/0181549 A1 | | 12/2002 | Linnartz et al. |
| 2004/0001554 A1 | * | 1/2004 | Sun et al. .................... 375/260 |
| 2004/0042439 A1 | * | 3/2004 | Menon et al. ............... 370/343 |

FOREIGN PATENT DOCUMENTS

| | | | | |
|---|---|---|---|---|
| EP | 001276251 A1 | * | 1/2003 | ............ H04B/7/08 |
| GB | 2386476 | | 9/2003 | |

OTHER PUBLICATIONS

Barreto, A. "Transmit Antenna Diversity for OFDM–based W–LANs with a priori Channel State Information" IBM Zurich Research Laboratory 2002 IEEE.

Barreto, A. "Antenna Transmit Diversity for Wireless OFDM Systems" IBM Zurich Research Laboratory 2002 IEEE.

Batariere, M.; Blankenship, T.; Kepler, J. Krauss, T.; Lisica, I.; Mukthavaram, S.; Porter, J. Thomas, T. Vook, F. "Wideband MIMO Mobile Impulse Response Measurements at 3.7 GHz" Motorola Labs Research Labratories.

Lo, T. "Maximum Ratio Transmission" IEEE Transactions on Communications vol. 47, No. 10, Oct. 1999.

Wong, K.; Cheng, R.; Letaief, K.; Murch, R. "Adaptive Antennas at the Mobile and Base Stations in an OFDM/TDMA System" IEEE 2001 vol. 49, No. 1.

Derryberry, R.; Gray, S.; Ionescu, D.; Mandyam, G.; Raghothaman, B. "Transmit Diversity in 3G CDMA Systems" IEEE Communications Magazine, Apr. 2002.

Iserte, A.; Perez–Neira, A.; Hernandez, M. "Joint Beamforming Strategies in OFDM–MIMO Systems" IEEE 2002.

Alamouti, S. "A Simple Transmit Diversity Technique for Wireless Communications" IEEE Journal on Select Areas In Communications vol. 16, No. 8 Oct. 1998.

Gerlach, D.; Paulraj, A.; "Adaptive Transmitting Antenna Arrays with Feedback" IEEE Signal Processing Letters vol. 1, No. 10 Oct. 1994.

Cavers, J. "Single–User and Multiuser Adaptive Maximal Ratio Transmission for Rayleigh Channels" IEEE Transactions on Vehicular technology vol. 49, No. 6, Nov. 2000.

* cited by examiner

*Primary Examiner*—Gregory C. Issing
(74) *Attorney, Agent, or Firm*—Kenneth A. Haas; Jeffrey K. Jacobs (57) ABSTRACT

In a multiple-input, multiple-output (MIMO) communication system, a method and apparatus for multi-antenna transmission. In accordance with the preferred embodiment of the present invention a reduced number of transmit weight matrices are fed back to the transmitter. Each transmit weight matrix is then applied to a plurality of subcarriers. Because each transmit weight matrix is applied to more than one subcarrier, the amount of weight matrixs being fed back to the transmitter is greatly reduced.

19 Claims, 6 Drawing Sheets

FIG. 1
*100*
—PRIOR ART—

MULTI-STREAM TRANSMIT BEAMFORMER (SUBCARRIER)

INFORMATION TO BE TRANSMITTED TO MULTIPLE USERS ON SUBCARRIER K

METHOD AND APPARATUS FOR MULTI-ANTENNA TRANSMISSION

FIELD OF THE INVENTION

The present invention relates generally to communication systems and in particular, to a method and apparatus for multi-antenna transmission within a communication system.

BACKGROUND OF THE INVENTION

Figure 1:
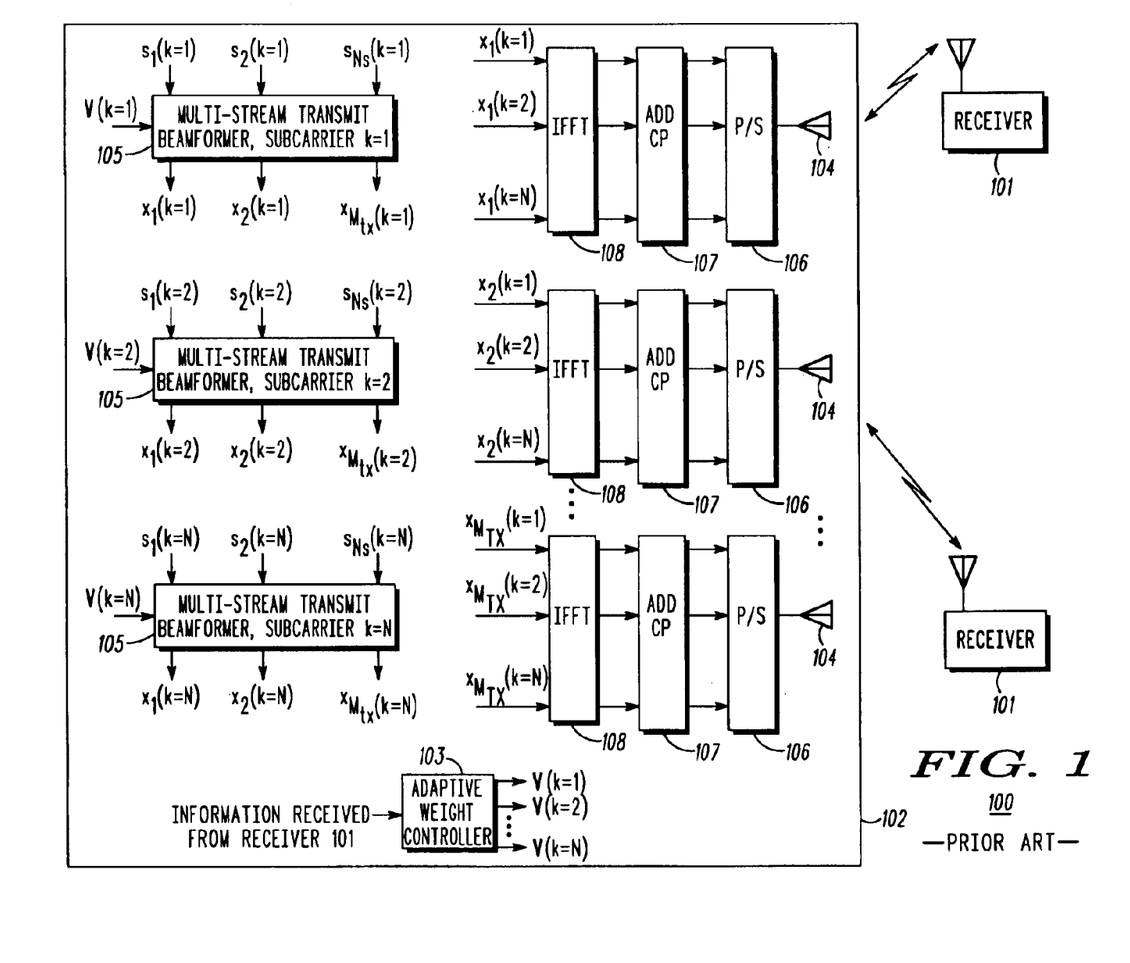
FIG. 1 is a block diagram of a communication system utilizing adaptive feedback and multicarrier transmit beamforming.

FIG. 1. illustrates a prior-art Multiple-Input-Multiple-Output (MIMO) transmission scheme implemented in an Orthogonal Frequency Division Multiplexing (OFDM) system. In the system of FIG. 1, transmitting device 102 employs multiple antennas 104 to transmit multiple data streams across multiple OFDM subcarriers to one or more receiving devices 101. The multiple data streams are denoted $s_i(k)$, where the index i denotes the stream number ($1 \leq i \leq N_s$) and the index k denotes the subcarrier ($1 \leq k \leq N$), where N is the number of subcarriers, $N_s \geq 1$ is the number of data streams per subcarrier. The signal fed to each of the $M_{tx}$ transmit antennas 104 is generated by an Inverse Fast Fourier Transform (IFFT) 108, a Cyclic Prefix Insertion Device 107 and a Parallel to Serial Converter 106. The OFDM transmission technique divides up the occupied frequency bandwidth into N orthogonal subcarriers, where each input to the IFFT corresponds to a subcarrier, and the signal fed into each input of the IFFT is said to occupy the corresponding subcarrier. The N inputs to each IFFT are called subcarriers, and in prior-art single transmit antenna OFDM systems, a coded modulation (i.e., QAM or PSK) symbol would typically be fed into the subcarrier inputs of the IFFT, one symbol per subcarrier, or equivalently, one data symbol stream per subcarrier. However, in the prior art MIMO-OFDM system shown in FIG. 1, on a given subcarrier (say the $k^{th}$), the $N_s$ symbols for the multiple streams are instead first fed into a multi-stream transmit beamformer 105 having $N_s$ inputs and $M_{tx}$ outputs (where $M_{tx}$ is the number of transmit antennas). The $M_{tx}$ outputs of each beamformer 105, denoted $x_m(k)$ ($1 \leq m \leq M_{tx}$, $1 \leq k \leq N$), are then fed to their respective subcarrier inputs on the $M_{tx}$ IFFTs 108. In one embodiment of the prior-art MIMO-OFDM transmitting device 102, the number of streams $N_s$ is equal to the number of transmit antennas $M_{tx}$, and on each subcarrier (say the $k^{th}$), the $i^{th}$ data stream for the $k^{th}$ subcarrier is fed to the $k^{th}$ subcarrier input of the $i^{th}$ transmit antenna, and the multi-stream transmit beamformers 105 are not used. However, better performance can often be obtained if the beamformers 105 are used prior to the IFFT subcarrier inputs.

Figure 2:
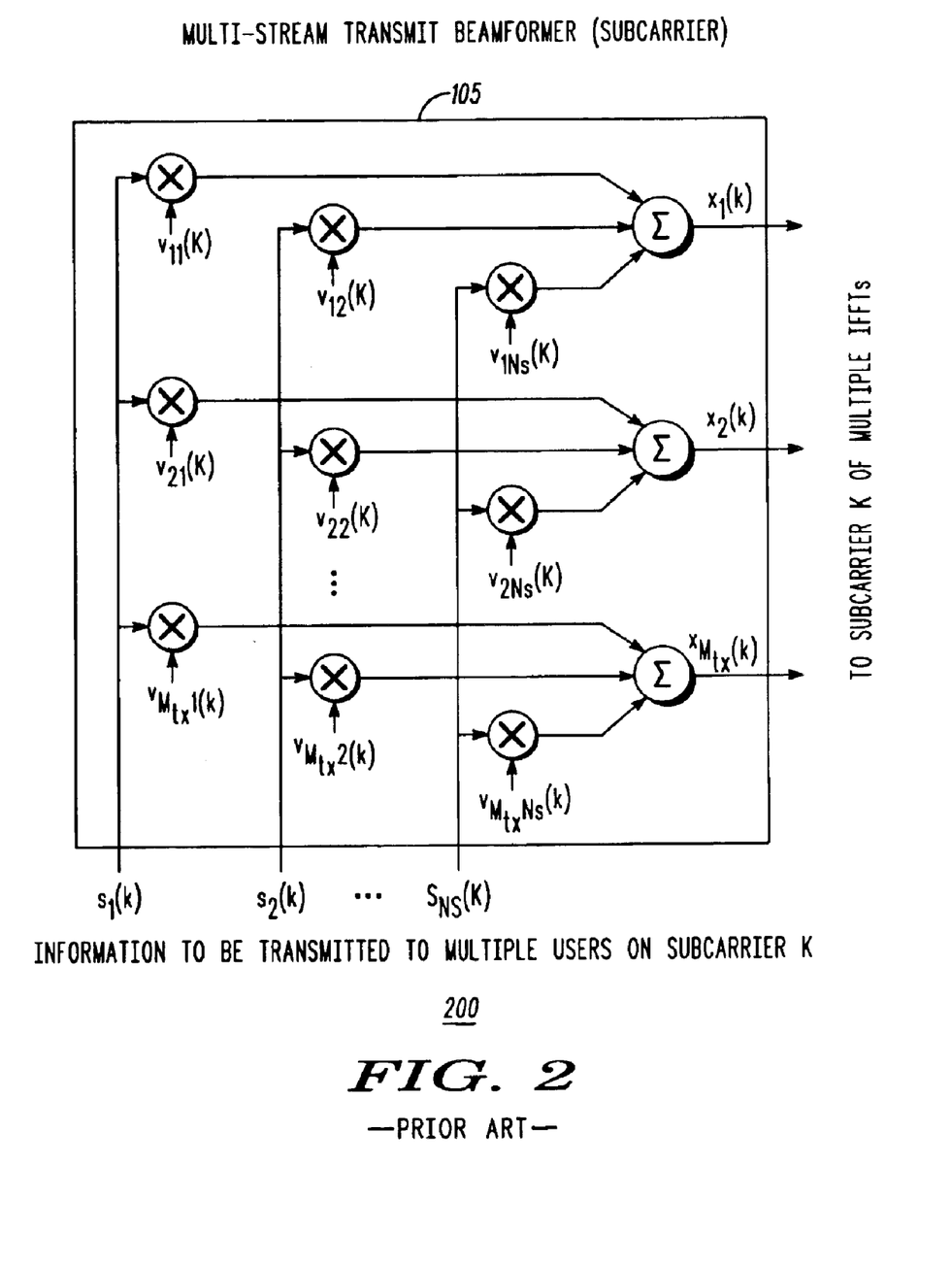
FIG. 2 is a block diagram of a multi-stream transmit beamformer for use in the communication system of FIG. 1.

FIG. 2 illustrates in more detail a prior-art multi-stream transmit beamformer 105 that is used prior to each subcarrier input on the $M_{tx}$ IFFTs 108 of the transmitting device 102. As shown in FIG. 2, each multi-stream transmit beamformer 105 of the transmitting device 102 employs transmit antenna array weights denoted with the $M_{tx} \times N_s$ matrix $V(k)=(v_1(k), v_2(k), \ldots, v_{N_s}(k))$, where $M_{tx}$ is the number of transmit antennas, $N_s$ is the number of data streams being delivered on the $k^{th}$ subcarrier, and the $i^{th}$ column of V(k) is denoted by the $M_{tx} \times 1$ column vector $v_i(k)$ that contains the $M_{tx}$ weighting coefficients for the $i^{th}$ data stream on the $k^{th}$ subcarrier. In order to calculate appropriate values for V(k), the transmitting device 102 generally requires some information about the channel response between transmitting antennas 104 and the one or more receive antennas on the receiving devices 101.

Returning to FIG. 1, receiving device 101 measures the downlink channel response and is responsible for sending back the information that is to be used by transmitting device 102 to compute the transmit antenna array weights $(V(k)=(v_1(k), v_2(k), \ldots, v_{N_s}(k))$, where k is the subcarrier and $N_s$ is the number of data streams per subcarier) that are applied to each subcarrier data stream. Typically, this information being sent back consists of the transmit weight vectors or an index into a codebook of possible weight vectors, or other information based on a similar technique. The $N_s$ data streams are then multiplied by weight vectors V(k=1) through V(k=N) in order to effectively deliver the multiple streams to the receiver 101.

As is evident, such a system requires transmitter 102 to know the matrix frequency response between the transmit and receive arrays, which can pose difficulties in rapidly-varying frequency-selective broadband channels, such as the type of channels encountered in mobile communication systems employing OFDM. More particularly, in a feedback-based transmit array system, such as that illustrated in FIG. 1, the transmit weight vector needs to be fed back to transmitter 102 and updated to track the channel variations that occur across time and frequency for optimal performance. Unfortunately, a mechanism that allows the complete tracking of the channel response may require prohibitive levels of feedback between the receiving device and the transmitting device. Therefore, a need exists for a method and apparatus for multi-antenna transmission within a communication system that does not require prohibitive levels of feedback when sending back channel information to be used by the transmitting device.

DETAILED DESCRIPTION OF THE DRAWINGS

To address the above-mentioned need, a method and apparatus for transmission is provided herein. In accordance with the preferred embodiment of the present invention a reduced number of transmit weight vectors are fed back to the transmitter. Each transmit weight vector is then applied to a plurality of subcarriers. Because each transmit weight vector is applied to more than one subcarrier, the amount of weight vectors being fed back to the transmitter is greatly reduced.

In order to obtain transmit weight vectors to be applied to a plurality of subcarriers, partitioning of the frequency bandwidth into a set of subcarrier blocks takes place. A set of optimized transmit weight vectors is computed for each subcarrier block based on an estimate on the matrix channel frequency response between the transmit array and the one-or-more antennas on the receiving device. The computation of the optimized transmit weight vectors can be performed at the transmitting device or the receiving device depending on the availability of a feedback channel.

If a feedback channel is available, then the receiving device can measure the channel response between the transmitting device and the receiving device and can then compute the set of optimized transmit weight vectors for each subcarrier block rather than for each subcarrier across the frequency band. These weight vectors for each subcarrier block (rather than for every subcarrier across the frequency band) are then sent back to the transmitting device via a feedback channel. Alternatively, information can be sent back to the transmitting device that allows the transmitting device to compute or infer the set of transmit weights that should be applied to each subcarrier block. Data is then transmitted from the transmitting device to the receiving device with a transmit array employing those transmit weights or some function of those transmit weights.

If a feedback channel is not available, the transmitting device measures the channel frequency response of the channel between the receiving device and the transmitting device (the uplink channel) and determines the channel response between the transmitting device and the receiving device based on the channel response measured between the receiving device and the transmitting device. The transmitting device then computes a set of transmit weight vectors for each subcarrier block (rather than for each subcarrier across the frequency band), which yields a computational savings over techniques that must compute a set of transmit weight vectors for each subcarrier across the frequency band. Data is then transmitted from the transmitting device to the receiving device with a transmit array employing those transmit weights or some function of those transmit weights.

The above-described method can yield substantial savings in required feedback compared to methods that simply send back a set of weight vectors for every subcarrier across the frequency band.

The present invention encompasses a method for multi-antenna transmission. The method comprises the steps of receiving a plurality of subcarriers at a receiver, the plurality of subcarriers being transmitted from a transmitter, grouping the subcarriers into a plurality of subcarrier blocks, each subcarrier block comprising K subcarriers, and calculating for each subcarrier block a single weighting $M_{tx} \times N_s$ matrix $V_c$. The weighting vector for the subcarrier blocks are then transmitted to the transmitter.

The present invention additionally encompasses a method for multi-antenna transmission. The method comprises the steps of receiving a plurality of subcarriers, grouping the plurality of subcarriers into a plurality of subcarrier blocks, each subcarrier block comprising K subcarriers, and calculating a single $M_{tx} \times N_s$ weighting matrix $V_c$ for each of the plurality of subcarrier blocks. All subcarriers within the subcarrier block are weighted with $V_c$.

The present invention additionally encompasses an apparatus comprising an adaptive weight controller, the adaptive weight controller having as an input, a plurality of subcarriers and outputting a plurality of $M_{tx} \times N_s$ weighting matrices $V_c$, wherein a single weighting vector is calculated for a subcarrier block comprising K subcarriers.

The preferred embodiment of the present invention utilizes an OFDM system similar to that described in FIG. 1. Communication system 100 utilizes an OFDM communication system protocol, however in alternate embodiments of the present invention, other system protocols may be utilized as well. Such other system protocols include, but are not limited to Frequency-Domain Equalized Single-Carrier Systems having Cyclic Prefixes (called Cyclic Prefix Single Carrier), Code Division Multiple Access systems having Cyclic Prefixes (called Cyclic Prefix CDMA), multi-carrier CDMA systems, and spread-OFDM systems. As a result, the invention is applicable and effective in OFDM systems, CP-Single Carrier systems, CP-CDMA systems, and any other similar or hybrid systems.

As one of ordinary skill in the art will recognize, an OFDM system divides the available bandwidth into very many narrow frequency bands (subcarriers), with data being transmitted in parallel on the subcarriers. Each subcarrier utilizes a different portion of the occupied frequency band. In an OFDM system with multiple transmit antennas, the signals to be transmitted on the subcarriers are fed into the inputs of the Inverse Fast Fourier Transform (IFFT) block 108. In block 107, a cyclic prefix is then added to the outputs of the IFFT block 108, and the resulting signals are then converted from parallel to serial in block 106. In the MIMO system of FIG. 1, multi-stream transmit beamforming is employed, whereby the data to be delivered in one OFDM symbol interval (or baud interval) is divided into a matrix of $N_s$ symbol streams by N subcarriers, whereby $N_s$ symbols are to be transmitted on each of the N subcarriers. The $N_s$ symbols to be transmitted on each a given subcarrier are first sent to a multi-stream transmit beamformer 105 where they are weighted and summed and then transmitted on that subcarrier over by a plurality of antennas.

FIG. 2 shows a block diagram of a multi-stream transmit beamformer which weights and sums the $N_s$ symbols to be transmitted on a subcarrier. As shown in FIG. 2, the $N_s \geq 1$ data streams that are to be transmitted on the $k^{th}$ subcarrier (or frequency) are denoted $s_1(k), s_2(k), \ldots, s_{N_s}(k)$, where $1 \leq k \leq N$. The weighted and summed signal to be transmitted over the plurality of transmit antennas on subcarrier k is denoted $x_1(k), x_2(k), \ldots, x_{Mtx}(k)$, where $1 \leq k \leq N$. Particularly, each data stream/antenna combination has a particular weight associated with it. On the $k^{th}$ subcarrier, this beamforming process is mathematically represented as:

$$X(k) = V(k)S(k) \quad (1)$$

where $X(k) = [x_1(k), x_2(k), \ldots, x_{Mtx}(k)]^T$ (where T is the transpose operator) is a $M_{tx} \times 1$ vector of signals fed to the $k^{th}$ subcarrier input of the IFFT, V(k) is a $M_{tx} \times N_s$ matrix of weighting coefficients given by $V(k) = [v_1(k), v_2(k), \ldots, v_{N_s}(k)]$, where the $i^{th}$ column of V(k) is denoted by the $M_{tx} \times 1$ column vector $v_i(k)$ that contains the $M_{tx}$ weighting coefficients for the $i^{th}$ data stream on the $k^{th}$ subcarrier (i.e., $v_i(k) = [v_{1i}(k), \ldots, v_{Mtxi}(k)]^T$). The $N_s \times 1$ vector S(k) is given as $S(k) = [s_1(k), s_2(k), \ldots, s_{N_s}(k)]^T$, and the time dependency (i.e., OFDM-symbol interval) of the system has not been shown for clarity.

Figure 3:
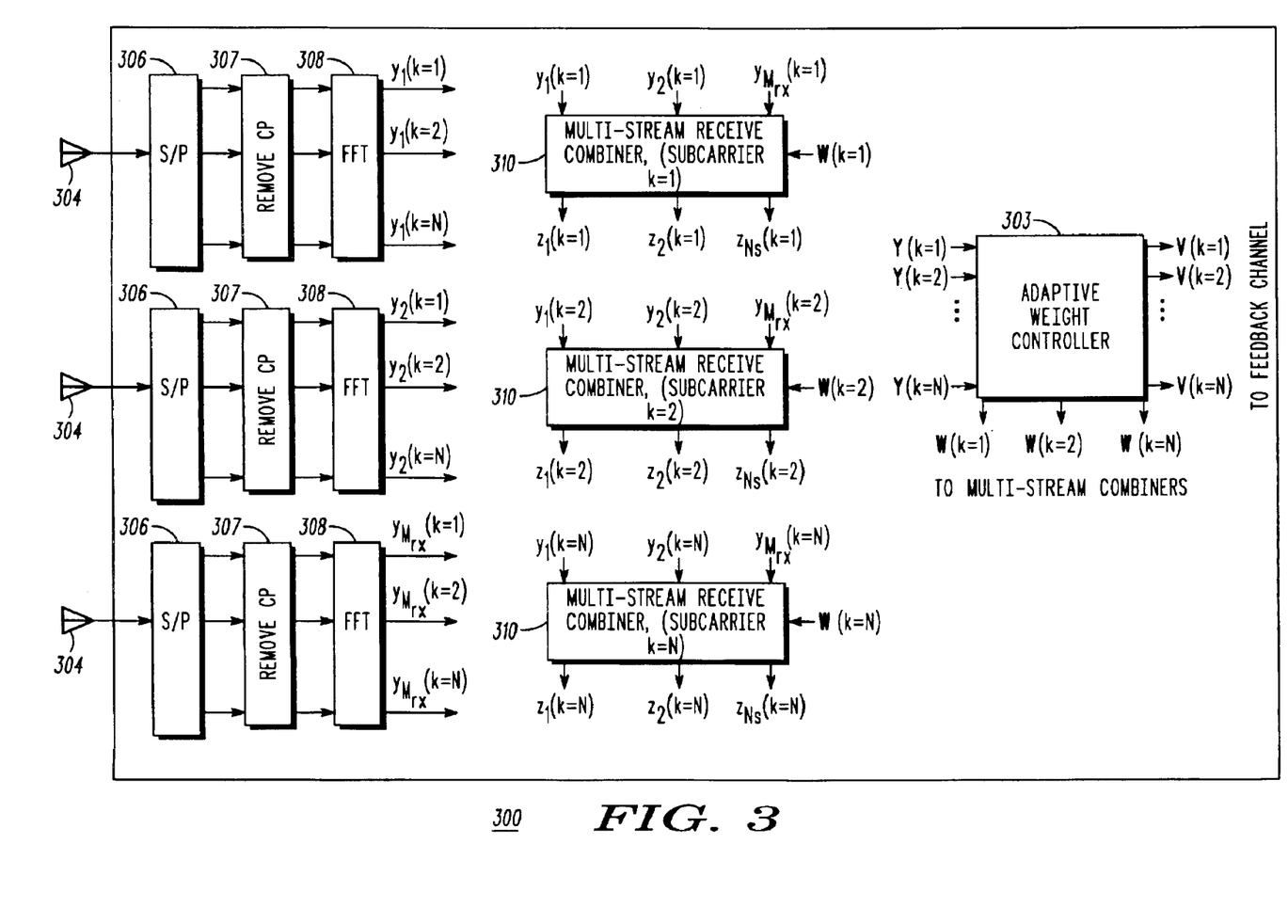
FIG. 3 is a block diagram of the receiver of FIG. 1 in accordance with the preferred embodiment of the present invention.

FIG. 3 shows a block diagram of the receiving device 300 that consists of one or more receive antennas 304. The signal received on each receive antenna is first converted to a base band sampled signal stream (this conversion to base band is not shown but is known in the art) that is then converted from serial to parallel (306). In block 307, the cyclic prefix is removed, and the remaining samples are converted into the frequency domain with a Fast Fourier Transform (FFT) in block 308. The signals on the $k^{th}$ subcarrier output of the FFT 308 behind the $i^{th}$ receive antenna is denoted $y_i(k)$, for $1 \leq i \leq M_{rx}$ and $1 \leq k \leq N$, where $M_{rx}$ is the number of receive antennas 304 and N is the number of subcarriers. The signals on the $k^{th}$ subcarrier ($1 \leq k \leq N$) are then fed into a multi-stream receive combiner 310 having $M_{rx}$ inputs and $N_s$ outputs, where each of the $N_s$ outputs, $z_1(k), \ldots, z_{N_s}(k)$, is intended to recover one of the $N_s$ transmitted data streams on the $k^{th}$ subcarrier.

Figure 4:
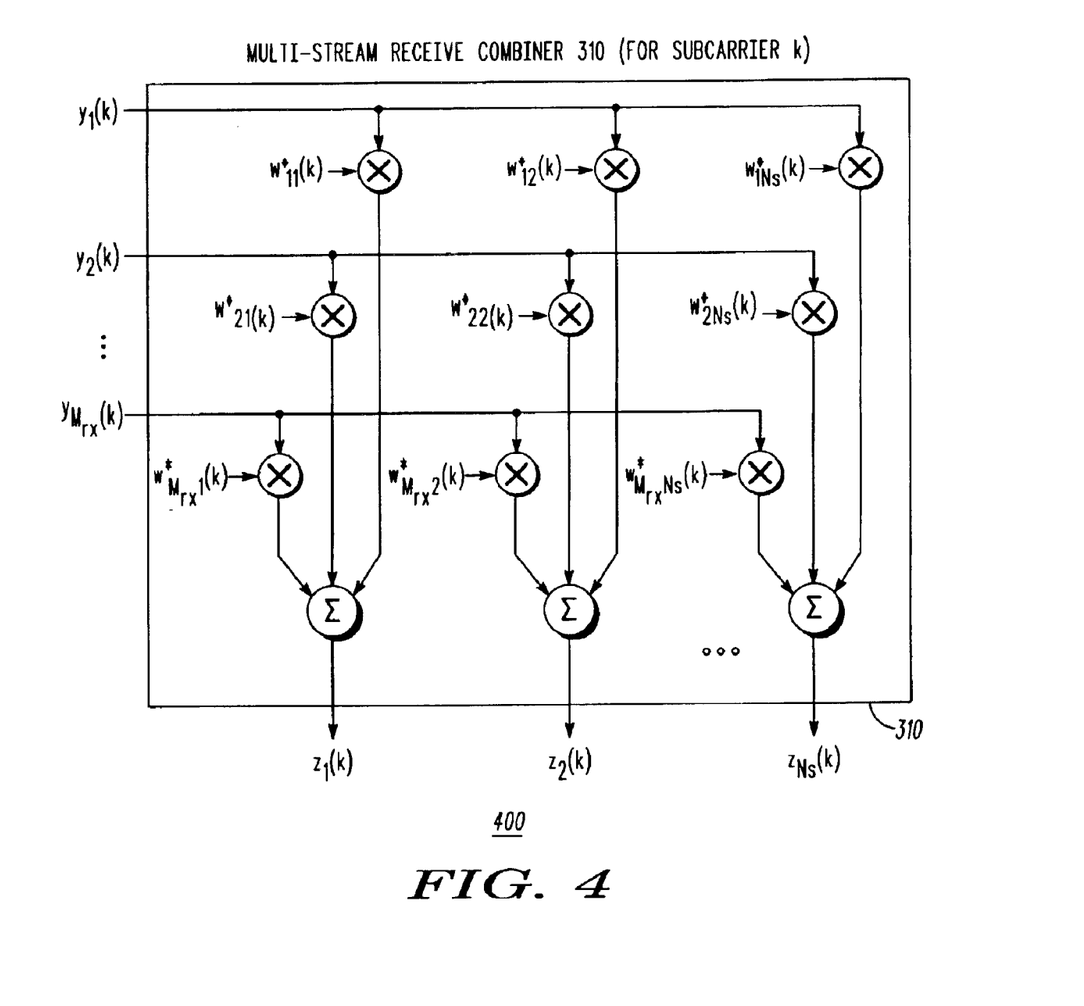
FIG. 4 is a block diagram of a multi-stream receive combiner for use in receiver of FIG. 3.

FIG. 4. shows a block diagram of a multi-stream receive combiner 310 for use on each subcarrier k. As shown in FIG. 4, each output of the multi-stream receive combiner is formed by weighting and summing the $M_{rx}$ signals received from the $M_{rx}$ receive antennas. The weighting coefficient for the $j^{th}$ stream of the $i^{th}$ receive antenna for the $k^{th}$ subcarrier is denoted as $w_{ij}(k)$. The $j^{th}$ output of the multi-stream combiner on subcarrier k is denoted $z_j(k)$, for $1 \leq j \leq N_s$ and $1 \leq k \leq N$.

Mathematically, the operation of the receiver on the $k^{th}$ subcarrier is as follows.

$$z(k) = W^H(k)Y(k) \quad (2)$$

where H is the conjugate transpose operator, $z(k) = [z_1(k), z_2(k), \ldots, z_{N_s}(k)]^T$ is a $N_s \times 1$ vector of combiner outputs on subcarrier k, $Y(k) = [y_1(k), y_2(k), \ldots, y_{M_{rx}}(k)]^T$ is a $M_{rx} \times 1$ vector of signals received on subcarrier k, and W(k) is a $M_{rx} \times N_s$ matrix of weighting coefficients, where $W(k) = [w_1(k), w_2(k), \ldots, w_{N_s}(k)]$, where the $i^{th}$ column of W(k) is denoted by the $M_{rx} \times 1$ column vector $w_i(k)$ that contains the $M_{rx}$ weighting coefficients for receiving the $i^{th}$ data stream on the $k^{th}$ subcarrier (i.e., $w_i(k) = [w_{1i}(k), \ldots, w_{M_{rx}i}(k)]^T$). The received signal vector Y(k) satisfies:

$$Y(k) = H(k)X(k) + N(k) \quad (3)$$

where H(k) is the $M_{rx} \times M_{tx}$ channel matrix on subcarrier k, N(k) is the $M_R \times 1$ vector of receiver noise on subcarrier k, and X(k) is the $M_{tx} \times 1$ transmitted signal vector on subcarrier k. In this analysis, the time-dependency in (3) is omitted for clarity.

The following description provides a mathematical description of how the $M_{tx} \times N_s$ transmit weighting coefficients V(k) and the $M_{rx} \times N_s$ receive weighting coefficients W(k) can be computed for the above transmission scheme when used in the downlink of an OFDM system. The text first deals with the case with one transmit stream ($N_s = 1$), which is referred to as a Maximal Ratio Transmission (MRT) scheme or transmit adaptive array (TXAA) scheme. The case of multiple streams ($N_s > 1$) is then described afterwards.

In a frequency-domain single-stream MRT/TXAA scheme for the OFDM downlink, a data symbol stream is "beamformed" on each subcarrier according to $X(k) = V(k) s(k)$ where V(k) is a $M_{tx} \times 1$ beamforming vector for the $k^{th}$ subcarrier and s(k) is the unit-average-power data symbol (i.e., PSK/QAM) for the $k^{th}$ subcarrier. In such a system, the transmit array at the base station generally needs to know the $M_{rx} \times M_{tx}$ matrix channel response H(k) between the transmit array and the receive array, and subscriber-to-base feedback techniques can be used to provide the base station with information that will help the base infer the channel response H(k) or in other cases the $M_{tx} \times 1$ transmit weight vector V(k) directly. In a subscriber-to-base feedback scheme, the receiving device (subscriber) 101 will measure the matrix channel response across the OFDM bandwidth, and the subscriber is responsible for conveying back to the base station (transmitting device 102) the appropriate set of information that allows the base station to compute its frequency-domain transmit beamforming weights.

For the single stream strategy, the received data on subcarrier k is then given by:

$$Y(k) = H(k)X(k) + N(k) = H(k)V(k)s(k) + N(k) \quad (4)$$

For linear receive array combining, the receiver computes the following signal on each subcarrier:

$$Z(k) = W^H(k)Y(k). \quad (5)$$

The transmit weight vector and the receive weight vector can be chosen as follows. On subcarrier k, the singular value decomposition of the $M_{rx} \times M_{tx}$ channel matrix is:

$$H(k) = U_H(k)S_H(k)Z_H^H(k) \quad (6)$$

where $M_{rx} \times M_{rx}$ $U_H(k)$ and $M_{tx} \times M_{tx}$ $Z_H(k)$ are unitary matrices and $M_{rx} \times M_{tx}$ $S_H(k)$ is a matrix of all zeros except for the upper left $r_H \times r_H$ portion which is given by $\text{diag}(s_{H,1}, \ldots, s_{H,r_H})$, where $r_H$ is the rank of H(k) ($r_H \leq \min(M_{tx}, M_{rx})$). Maximizing the SNR on the $k^{th}$ subcarrier of the receive array output involves choosing the $M_{tx} \times 1$ transmit weight vector V(k) according to:

$$V(k) = Z_{H1}(k), \quad (7)$$

where $Z_{H1}(k)$ is the first column of $Z_H(k)$. The receive weight vector is then chosen according to:

$$W(k) = \alpha H(k)V(k) \quad (8)$$

where $\alpha$ is a scalar constant that does not affect the post receive combining Signal to Noise Ratio (SNR). The constant $\alpha$ can be chosen to provide an MMSE solution to the receive weight vector, which results in:

$$W(k) = \frac{H(k)V(k)}{V^H(k)H^H(k)H(k)V(k) + \sigma^2/\sigma_s^2} \quad (9)$$

where $\sigma^2$ is the receiver noise variance and $\sigma_s^2$ is the power in the transmitted symbol constellation (assumed to be one). An implications of the above description is that the transmit and receive weight vectors must be chosen to track any subcarrier-dependent variations in the channel matrix H(k).

With one receive antenna (H(k) is $1 \times M_{tx}$), the maximum SNR on the $k^{th}$ subcarrier can be shown to be:

$$SNR\_TXAA(M_{tx}Tx, 1Rx) = H(k)H^H(k)/\sigma^2 \quad (10)$$

Note that for the case of two transmit antennas and one receive antenna, this quantity is twice the value of (12), which causes TXAA to be 3 dB better than the Alamouti method which is known in the art (see the reference in the next paragraph) in this case. In general, the SNR for TXAA is:

$$SNR\_TXAA(M_{tx}Tx, M_{rx}Rx) = \lambda_1/\sigma^2 \quad (11)$$

where $\lambda_1$ is the largest eigenvalue of $H^H(k)H(k)$.

For comparison with the above transmission scheme, the transmission scheme described by S. M. Alamouti, "A simple transmit diversity technique for wireless communications," IEEE Journal on Select Areas in Communications, vol. 16, no. 8, October 1998, is easily extended to OFDM by Alamouti-encoding two frequency-domain symbols across two OFDM symbol intervals and one subcarrier. Assuming a static channel, unit-power transmitted symbols, $M_{tx} = 2$ transmit antennas and $M_{rx} = 1$ receive antenna, the expected SNR on the $k^{th}$ subcarrier for the Alamouti scheme is given by $$SNR\_\text{Alamouti}(2Tx, 1Rx) = H(k)H^H(k)/(2\sigma^2), \quad (12)$$

where H(k) is the $M_{rx} \times M_{tx}$ channel matrix on subcarrier k. Note that for the case of two transmit antennas and one receive antenna, this quantity is one-half the value of (10), which causes Alamouti to be 3 dB worse than TXAA. With two or more receive antennas, the SNR expression is:

$$SNR\_\text{Alamouti}(2Tx, M_{rx}Rx) = (\lambda_1 + \lambda_2)/(2\sigma^2), \quad (13)$$

where $\lambda_1$ and $\lambda_2$ are the two eigenvalues of $H^H(k)H(k)$.

Note that the per-subcarrier SNR with a $2 \times M_{rx}$ TXAA scheme is proportional to the largest eigenvalue of $H^H(k)H(k)$, whereas from (13), the SNR with $2 \times M_{rx}$ Alamouti is proportional to the average of the two eigenvalues of $H^H(k)H(k)$. As a result, in a $2 \times M_{rx}$ configuration with perfect channel knowledge at both the transmitter and receiver, the SNR of the Alamouti scheme will be anywhere between 0 and 3 dB worse than TXAA, with the actual difference being determined by the eigenvalues of $H^H(k)H(k)$.

For the multi-stream case (i.e., $N_s>1$), otherwise known as a MIMO or spatial multiplexing strategy, the relationships of (1) (2), and (3) define the relationship between the transmitted and received data. An MMSE solution to the receive weight matrix can be found in terms of an arbitrary $M_{tx} \times N_s$ transmit weight matrix $V(k)$ according to the following equation:

$$W(k) = \{H(k)V(k)R_s V^H(k)H^H(k) + \sigma^2 I\}^{-1} H(k)V(k)R_s \quad (14)$$

where $R_s$ is the covariance matrix of the transmitted streams: $R_s = E[S(k)S^H(k)]$, which for independent streams is a diagonal matrix with the powers of the streams arranged along the diagonal. One way of choosing the transmit and receive weights is as follows.

Using the relationship in (6), the $M_{tx} \times N_s$ transmit weight matrix $V(k)$ can be chosen to be equal to the right singular matrix $Z_H(k)$, and the receive weight matrix can then be chosen to equal to $U_H(k) S_H^{-1}(k)$, in which case the multi-stream receive combiner output vector $Z(k)$ is given by $Z(k) = S(k) + S_H^{-1}(k) U_H(k) N(k)$. As a result, the channel has effectively been "diagonalized" into parallel non-interfering spatial channels between the input to the transmit array and the input to the receive array, and the multi-stream receiver combiner output vector equals the $N_s \times 1$ transmitted multi-stream symbol vector $S(k)$ plus noise. Other variations on this basic idea of diagonalizing the channel can be implemented, as well as other variations that are designed, for example, to cause the output mean square errors of all the streams to be equal.

As shown in the preceding analysis, the transmit and receive weight matrices are dependent on the instantaneous value of the channel matrix $H(k)$ across subcarrier k (where the time dependency of $H(k)$ has been left out of the analysis for clarity). As described above, transmitter adaptive weight controller 103 may calculate the $M_{tx} \times N_s$ weight matrix $V(k)$ for each subcarrier k based on information sent back from receiver 101. Typically, this information being sent back consists of the transmit weight matrices or an index into a codebook of possible weight matrices, or other information based on a similar technique.

As described above, a feedback mechanism that allows the complete tracking of the channel response may require prohibitive levels of feedback from receiving device 101. In order to address this issue, in the preferred embodiment of the present invention the plurality of subcarriers $k=1,2,\ldots,N$ are divided up into blocks, where the multi-stream transmit beamforming process associated with each block is intended to employ the same $M_{tx} \times N_s$ weighting matrix $V_c$ for every subcarrier within the block. The information fed back from receiver 101 comprises information for each block of subcarriers, rather than information for all N subcarriers, thereby greatly minimizing the amount of data needing to be fed back to the transmitter 102. For example, a prior-art system containing N subcarriers requires a transmit weight matrix for all N subcarriers to be fed back so that the appropriate weights can be employed for each subcarrier/antenna combination. To avoid having to feedback a different $M_{tx} \times N_s$ weighting matrix $V(k)$ for each of the N OFDM subcarriers, the frequency domain is divided into a number of blocks each consisting of K subcarriers. For each block of K subcarriers, the transmit array is provided with only one $M_{tx} \times N_s$ transmit weight matrix, $V_c$, to be used across those K subcarriers of the block. When a feedback channel is used, receiver 101 only feeds back one $M_{tx} \times N_s$ transmit weight matrix for each block, greatly reducing the amount of feedback.

The above description detailed the partitioning of subcarriers into subcarrier blocks to greatly reduce the information fed back to transmitter 102. The following description details a method for computing a single $M_{tx} \times N_s$ transmit weight matrix (or vector when $N_s=1$) that is to be applied across a block of OFDM subcarriers in frequency-selective channels where only one data stream is transmitted on a subcarrier (that is, $N_s=1$). The extension to the multi-stream case ($N_s>1$) is then described afterwards.

Frequency-Domain Eigenbeamforming Based on the Transmit Covariance Matrix

As discussed above, it is desirable to avoid having to feedback a different $V(k)$ for every OFDM subcarrier k. In the preferred embodiment of the present invention the frequency domain is divided into a number of blocks (B blocks) each consisting of K subcarriers (where B=N/K if the B blocks are non-overlapping in the frequency domain—other overlapping block assignments are possible). For each block of K subcarriers, the transmit array is provided with only one $M_{tx} \times 1$ (that is $N_s=1$) transmit weight vector to be used across those K subcarriers. The question at hand is then how best to compute the transmit weight vector that should be applied across the K subcarriers of a given block. In this case, the data received at the receive array for $k=1 \ldots K$ of the given block is:

$$Y(k) = H(k)X(k) + N(k) = H(k)V_c s(k) + N(k) \quad (15)$$

where $V_c$ is a $M_{tx} \times 1$ transmit weight vector that is applied between subcarriers 1 through K of the block. A simple method is to compute the transmit weight vector based on the channel matrix at the midpoint of the block of subcarriers with the transmit weight vector applied across all subcarriers of the subcarrier block. However, in the preferred embodiment of the present invention the transmit weight vector is chosen to maximize the noise-less receive signal power averaged across the K subcarrier sub-block subject to a unit-power constraint on the transmit weight vector. The goal is to choose $V_c$ to maximize:

$$P_y = E\left\{\frac{1}{K}\sum_{k=1}^{K} Y^H(k)Y(k)\right\} \quad (16)$$

where $Y(k)$ is the received signal, E is the expectation operator (expectation over the signal and noise), and K is the number of subcarriers within the particular subcarrier block. It should be noted that the expectation is over the signal terms in the expression for $Y(k)$ in (15). Substituting (15) into (16) and taking the expectation results in:

$$P_y = V_c^H \left\{\frac{1}{K}\sum_{k=1}^{K} H^H(k)H(k)\right\} V_c + M_R \sigma^2 \quad (17)$$

Choosing a unit-norm $V_c$ to maximize the expression in (17) involves choosing $M_{tx} \times 1$ transmit weight vector $V_c$ to be the eigenvector corresponding to the largest eigenvalue of the quantity:

$$R_{HK} = \frac{1}{K}\sum_{k=1}^{K} H^H(k)H(k) \quad (18)$$

subject to the constraint $V_c^H V_c = 1$. The $M_{tx} \times M_{tx}$ matrix $R_{HK}$ is an estimate of what is essentially the transmit-channel covariance matrix averaged over the K-subcarrier bandwidth. Note that although the receiver noise power does not enter into this solution for $V_c$, the solution also maximizes the post-receive-combining SNR averaged across the frequency subcarrier block. The receive weight vector can then be chosen according to (14) (after V(k) has been replaced with $V_c$ for all k within the particular subcarrier block), where the receiver must be provided with an estimate of the channel matrix H(k) and the transmit weight vector (or equivalently the value of their product $H(k)V_c$, or more generally H(k)V(k)) on each subcarrier of the frequency block.

This eigenbeamforming approach can also be extended to the multi-stream (MIMO) strategy by choosing the $N_s$ transmit weight vectors (denoted with the $M_{tx} \times N_s$ weight matrix $V_C$) to be the $N_s$ eigenvectors corresponding to the $N_s$ largest eigenvalues of the transmitter covariance matrix of the channel (e.g., (18)). More generally, the $N_s$ transmit weight vectors can be chosen to be a function of the $N_s$ eigenvectors corresponding to the $N_s$ largest eigenvalues of the transmitter covariance matrix of the channel (e.g., (18)), where the function can be a linear transformation or some other appropriate transformation. The receive weight matrix can then be chosen according to (14), where the receiver must ultimately be provided with an estimate of the channel matrix H(k) and the transmit weight matrix V(k) (or equivalently the value of their product $H(k)V_C$, or more generally H(k)V(k)) on each subcarrier of the frequency block. Other transmission strategies based on the estimate of the transmit covariance matrix of (18) can be employed as well.

FIG. 3 is a block diagram of receiver 101 of FIG. 1 in accordance with the preferred embodiment of the present invention. As described above, receiver 101 operates with a receive weight vector $W(k)=(w_1(k), w_2(k), \ldots, w_{M_{rx}}(k))$ being applied to each of the N subcarriers received by the $M_{rx}$ antennas. During a pilot training sequence, adaptive weight controller 303 receives an over-the-air transmission of all N subcarriers Y(k=1), Y(k=2), . . . , Y(k=N). As discussed above, for each subcarrier k, Y(k)=H(k)X(k)+N (k). Because the pilot sequence is known apriori, X(k) is therefore known. Adaptive weight controller 303, knowing both Y(k) and X(k), calculates H(k) for each subcarrier k. Knowing H(k) for each subcarrier, adaptive weight controller 303 then computes the transmit covariance matrix $R_{HK}$ (Equation (18)) for each block of K subcarriers, where the practice of dividing the N subcarriers into a plurality of blocks each containing K subcarriers is known to both the transmitting device 102 and the receiving device 101. The receiving device 101 then chooses a value of $V_c$ for each of the subcarrier blocks to be the eigenvector corresponding to the largest eigenvalue of the quantity:

$$R_{HK} = \frac{1}{K}\sum_{k=1}^{K} H^H(k)H(k) \qquad (19)$$

subject to the constraint $V_c^H V_c = 1$. The $M_{tx} \times M_{tx}$ matrix $R_{HK}$ is an estimate of what is essentially the transmit-channel covariance matrix averaged over the K-subcarrier bandwidth. Note that although the receiver noise power does not enter into this solution for $V_c$, the solution also maximizes the post-receive-combining SNR averaged across the frequency block.

Figure 5:
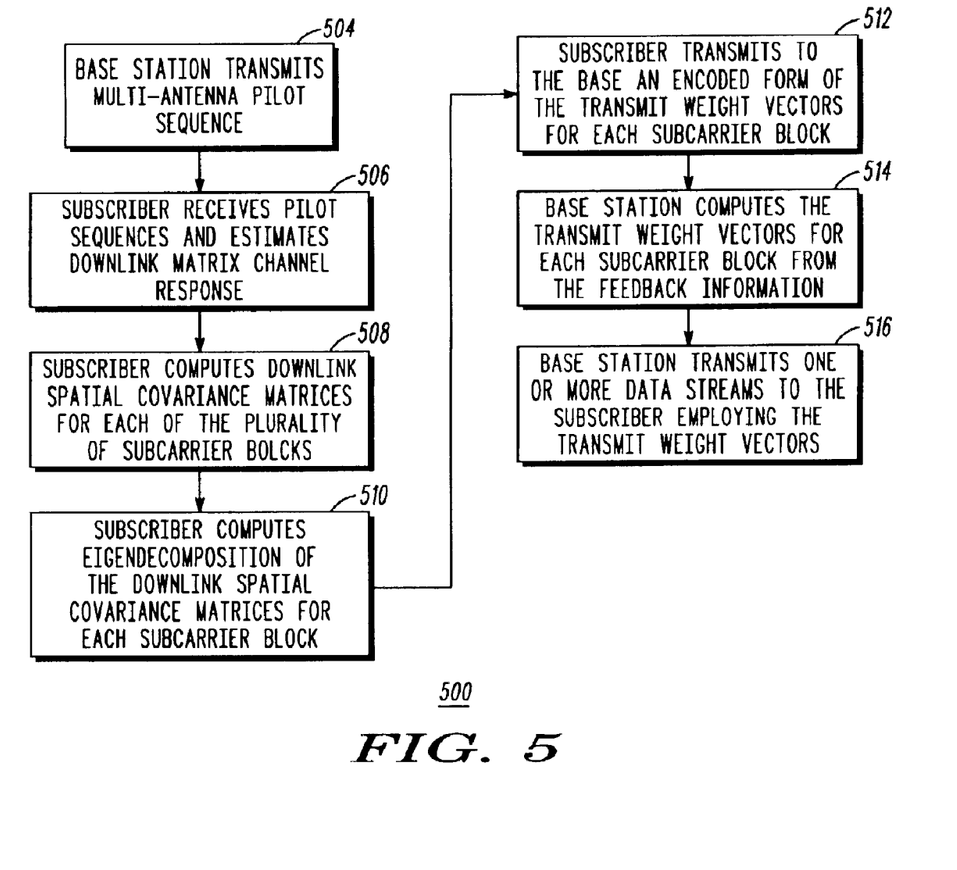
FIG. 5 is a flow chart showing operation of the communication system of FIG. 1 in accordance with the preferred embodiment of the present invention when operating in feedback mode.

FIG. 5 shows a flowchart illustrating the operation of the present invention in a feedback mode of operation where the transmitting device 102 is a base station and the receiving device 101 is a subscriber device or mobile device. (The process also applies in the case where the transmitting device is a subscriber device and the receiving device is a base station).

The process starts in block 504 with the base station transmitting pilot signals from all transmit antennas to the subscriber device. In block 506, the subscriber receives the pilot signals (corrupted by the channel), and the subscriber estimates the matrix frequency response of the $M_{rx} \times M_{tx}$ channel matrix H(k) across all subcarriers k using a-priori knowledge of the transmitted pilot signals. (Other channel estimation techniques are possible, even techniques that do not involve the use of pilot signals.) In block 508, the subscriber computes the $M_{tx} \times M_{tx}$ downlink spatial covariance matrix $R_{HK}$ on each of the plurality of subcarrier blocks (each block having K subcarriers, where one $R_{HK}$ is computed for each subcarrier block). In block 510, the subscriber computes the eigen decomposition of each of the downlink spatial covariance matrices for each subcarrier block to produce a set of $N_s$ transmit weight vectors for each subcarrier block. In block 512, the subscriber transmits the $B \times N_s$ set of $M_{tx} \times 1$ weight vectors ($N_s$ weight vectors for each of the B subcarrier blocks with $M_{tx}$ transmit antennas) back to the base station on a feedback channel. These weight vectors are encoded for transmission across the feedback channel in a manner that permits the base station to determine the actual $N_s$ weight vectors that should be applied on each subcarrier block. In block 514, the base station decodes and processes the feedback transmission, which yields the $N_s$ weight vectors for each subcarrier block that were conveyed to the base station by the subscriber. In one embodiment of the present invention, for each frequency subcarrier block, the base simply applies the $N_s$ weight vectors for the subcarrier block to the all subcarriers within the subcarrier block (shown in flowchart block 516). In another embodiment, the base station in block 514 further processes these $B \times N_s$ weight vectors by interpolating the weight vectors across all subcarriers to produce $N \times N_s$ transmit weight vectors for each of the N subcarriers across the usable frequency band (not just one per subcarrier-block). In either embodiment, in block 516, the base station transmits the $N_s$ data streams on each of the N subcarriers based on the computed transmit weight vectors ($N_s$ data streams per subcarrier across N subcarriers).

In an alternate mode of operation, block 508 computes a downlink spatial covariance matrix for each of the B blocks in a manner slightly different from what is described above. Using the channel response at one of the subcarriers (say subcarrier k) in the subcarrier block (preferably the middle subcarrier of the block) or the mean of the channel averaged over the block, the downlink spatial covariance matrix is computed to be $R_{HK} = H(k)^H H(k)$ (rather than according to (18), which involves more computations), and the eigen decomposition of this spatial covariance matrix is computed in block 510 to produce the $N_s$ weight vectors for the subcarrier block. In block 512, the $B \times N_s$ weight vectors are fed back to the base station in an encoded form as previously described, where in block 514, the base station decodes the feedback information to produce the $B \times N_s$ weight vectors. As mentioned above, the base can then optionally interpolate these $B \times N_s$ weight vectors to produce $N \times N_s$ interpolated transmit weight vectors for each of the N subcarriers across the usable frequency band (not just one per subcarrier-block). In another embodiment, the subscriber feeds back just the channel at the middle subcarrier of the block (or alternatively the mean channel on the block) to the base station in block 512. The base station then computes the eigen decomposition $R_{HK} = H(k)^H H(k)$ to determine the transmit weight vectors in block 514. Because in this embodiment the base computes the weight vectors, computational complexity is reduced at the subscriber (and hence battery power is saved).

Figure 6:
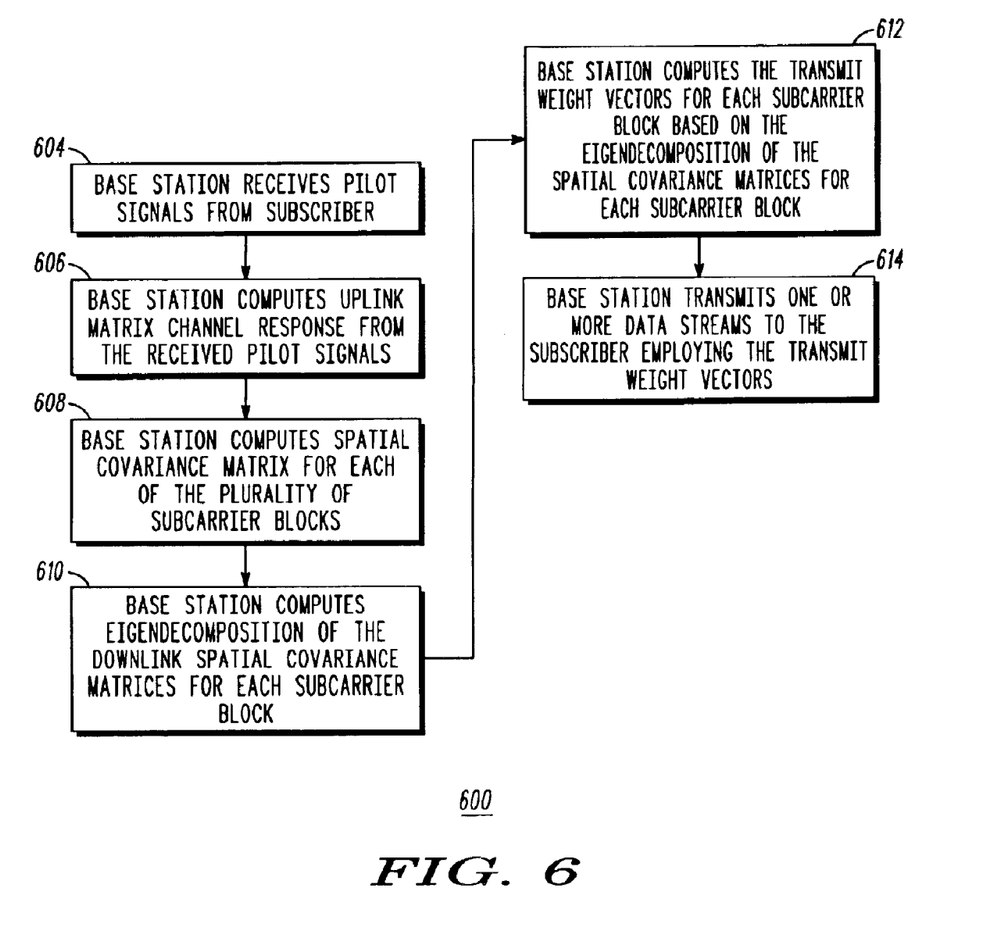
FIG. 6 is a flow chart showing operation of the communication system of FIG. 1 in accordance with the preferred embodiment of the present invention

FIG. 6 shows a flowchart illustrating the operation of the present invention in a mode of operation where a feedback channel is not available or simply not used. In FIG. 6, the transmitting device 102 is a base station and the receiving device 101 is a subscriber device or mobile device, although the process also applies in the case where the transmitting device is a subscriber device and the receiving device is a base station. The process starts in block 604 where the base station receives pilot signals (corrupted by the channel) from the subscriber and computes in block 606 the uplink (subscriber-to-base) matrix channel response based on the received pilot signals. (Other channel estimation techniques are possible, even techniques that do not require pilot symbols.) The base station then determines the channel gains from the base station to the subscriber device from the subscriber-to-base channel responses (via a reciprocity assumption or other similar assumption based on knowledge of the transmit and receive hardware). This determination will produce an estimate of the $M_{tx} \times M_{rx}$ channel matrix H(k) (between the base station and the subscriber) for each subcarrier k. Next, in block 608, the base station computes a transmit spatial covariance matrix according to Equation (18) for each of the plurality of B subcarrier blocks, where each subcarrier block contains K subcarriers (a different spatial covariance matrix is generally computed for the different subcarrier blocks depending on the values of the channel matrices H(k) for the subcarriers k within the subcarrier blocks). Next, in block 610, the base station computes an eigen decomposition for each of the B spatial covariance matrices computed in block 608 to produce $B \times N_s$ transmit weight vectors ($N_s$ transmit weight vectors for each of the B subcarrier blocks). In block 612, for each subcarrier block, the base station computes the actual transmit weight vectors for each subcarrier within the subcarrier block to be the $N_s$ transmit weight vectors for that block, as computed by from the eigen decomposition in block 610. (In other words, the $N_s$ transmit weight vectors are fixed across the subcarriers of the subcarrier block.) In another embodiment (similar to what is described in FIG. 5), the $N_s$ transmit weight vectors produced from the eigen decomposition in block 610 are then interpolated across all subcarriers of the band to produce $N \times N_s$ interpolated transmit weight vectors for each of the N subcarriers across the usable frequency band (not just one per subcarrier-block).

In an alternate mode of operation, block 610 computes a downlink spatial covariance matrix for each of the B blocks in a manner slightly different from what is described above. Using the channel response at one of the subcarriers (say subcarrier k) in the subcarrier block (preferably the middle subcarrier of the block) or the mean of the channel averaged over all subcarriers in the block, the downlink spatial covariance matrix is computed to be $R_{HK} = H(k)^H H(k)$ (rather than according to (18), which involves more computations), and the eigen decomposition of this spatial covariance matrix is computed in block 510 to produce the $N_s$ weight vectors for the subcarrier block. These $N_s$ weight vectors for each of the B blocks are then interpolated across the bandwidth to produce $N \times N_s$ transmit weight vectors for each of the N subcarriers across the usable frequency band (not just one per subcarrier-block).

While the invention has been particularly shown and described with reference to a particular embodiment, it will be understood by those skilled in the art that various changes in form and details may be made therein without departing from the spirit and scope of the invention. For example, the above description detailed the case where each block of subcarriers contained the same number of subcarriers, K. In an alternative embodiment, each block of subcarriers could contain a different number of subcarriers designated $K_b$ (for b=1, ... B where B is the total number of subcarrier blocks) where $K_b \geq 1$ and at least one $K_b$ is strictly greater than 1. Furthermore, the above description detailed the case where each subcarrier block contained different subcarriers (i.e., non-overlapping subcarrier blocks). In an alternative embodiment, the blocks of subcarriers may partially overlap each other. It is intended that such changes come within the scope of the following claims.

What is claimed is:

1. A method for multi-antenna transmission, the method comprising the steps of:
   receiving a plurality of frequency subcarriers at a receiver, the plurality of frequency subcarriers being transmitted from a transmitter;
   grouping the frequency subcarriers into a plurality of frequency subcarrier blocks, each frequency subcarrier block comprising a plurality K of frequency subcarriers; and
   calculating for each frequency subcarrier block a single weighting matrix $V_c$, for use in a transmission of multi-antenna signal, wherein the single weighting matrix $V_c$ is calculated based on a matrix channel frequency response between the transmitter and the receiver on the frequency subscriber block for which $V_c$ is being calculated.

2. The method of claim 1 further comprising the step of:
   transmitting the weighting matrices for the frequency subcarrier blocks to the transmitter.

3. The method of claim 1 wherein the step of calculating $V_c$ comprises the step of choosing $V_c$ to maximize:

$$P_y = E\left\{\frac{1}{K}\sum_{k=1}^{K} Y^H(k)Y(k)\right\}$$

where
   $Y(k) = H(k)V_c s(k) + N(k)$,
   H(k) is a matrix channel response between the transmitter and the receiver for a $k^{th}$ subcarrier,
   N(k) is received noise, and
   E is an expectation operator.

4. The method of claim 1 wherein the step of calculating $V_c$ comprises the step of choosing $V_c$ to be a function of the eigenvectors of the quantity $$R_{HK} = \frac{1}{K}\sum_{k=1}^{K} H^H(k)H(k)$$

where
   H(k) is a matrix channel response between the transmitter and the receiver for a $k^{th}$ subcarrier and $Y(k) = H(k)V_c S(k) + N(k)$.

5. The method of claim 2 wherein the step of transmitting the weighting matrix to the transmitter comprises the step of transmitting the weighting matrix to the transmitter causing the transmitter to weight all frequency subcarriers within the frequency subcarrier block with the weighting matrix.

6. The method of claim 1 further comprising the steps of:
   receiving, by the transmitter, the weighting matrix; and
   weighting all frequency subcarriers within a frequency subcarrier block with the weighting matrix.

7. The method of claim 1 further comprising the steps of:
   receiving by the transmitter, the weighting matrix for each frequency subcarrier block;
   computing an interpolated transmit weight matrix for each frequency subcarrier based on the received weighting matrix for each of the frequency subcarrier blocks; and
   weighting all frequency subcarriers with the interpolated transmit weight matrix.

8. The method of claim 1 wherein the step of receiving the plurality of frequency subcarriers comprises the step of receiving the plurality of frequency subcarriers within an Orthogonal Frequency Division Multiplexing (OFDM) communication system.

9. The method of claim 1 wherein the step of receiving the plurality of frequency subcarriers comprises the step of receiving a plurality of frequency subcarriers, each frequency subcarrier being transmitted on a differing frequency.

10. A method for multi-antenna transmission, the method comprising the steps of:

receiving a plurality of frequency subcarriers;

grouping the plurality of frequency subcarriers into a plurality of frequency subcarrier blocks, each frequency subcarrier block comprising a plurality K of frequency subcarriers;

calculating a single weighting matrix $V_c$ for each of the plurality of frequency subcarrier blocks and for use in a transmission of a multi-antenna signal, wherein the single weighting matrix $V_c$ is calculated based on a matrix channel frequency response between a transmitter and a receiver on the frequency subcarrier block for which $V_c$ is being calculated; and weighting all frequency subcarriers within the frequency subcarrier block with $V_c$.

11. The method of claim 10 wherein the step of calculating the single weighting matrix for the plurality of frequency subcarrier blocks comprises the step of choosing $V_c$ to maximize:

$$P_y = E\left\{\frac{1}{K}\sum_{k=1}^{K} Y^H(k)Y(k)\right\}$$

where

Y(k)=H(k)V$_c$s(k)+N(k),

H(k) is a matrix channel response between a transmitter and a receiver,

N(k) is received noise, and

E is an expectation operator.

12. The method of claim 10 wherein the step of calculating the single weighting matrix for each of the plurality of frequency subcarrier blocks comprises the step of choosing $V_c$ to be the eigenvector corresponding to the largest eigenvalue of the quantity $$R_{HK} = \frac{1}{K}\sum_{k=1}^{K} H^H(k)H(k)$$

where

H(k) is a matrix channel response between a transmitter and a receiver for a $k^{th}$ subcarrier.

13. The method of claim 10 wherein the step of receiving the plurality of frequency subcarriers comprises the step of receiving the plurality of frequency subcarriers within an Orthogonal Frequency Division Multiplexing (OFDM) communication system.

14. The method of claim 10 wherein the step of receiving the plurality of frequency subcarriers comprises the step of receiving a plurality of frequency subcarriers, each frequency subcarrier being transmitted on a differing frequency.

15. The method of claim 10 wherein the step of weighting all frequency subcarriers comprises the steps of:

computing interpolated transmit weight matrices based on the set of weighting matrices Vc for each frequency subcarrier block; and weighting all frequency subcarriers with the interpolated transmit weight matrices.

16. An apparatus comprising:

an adaptive weight controller, the adaptive weight controller having as an input, a plurality of frequency subcarriers and outputting a plurality of weighting matrices $V_c$, wherein:

a single weighting matrix is calculated for a frequency subcarrier block comprising a plurality K of frequency subcarriers, wherein the single weighting matrix is calculated based on a matrix channel frequency response between a transmitter and a receiver on the frequency subcarrier block; and a transmitter adapted to transmit a multi-antenna signal that is formed based on the single weighting matrix $V_c$ for each frequency subcarrier block.

17. The apparatus of claim 16 wherein the adaptive weight controller chooses $V_c$ to maximize:

$$P_y = E\left\{\frac{1}{K}\sum_{k=1}^{K} Y^H(k)Y(k)\right\}$$

where

Y(k)=H(k)V$_c$s(k)+N(k),

H(k) is a matrix channel response between the transmitter and the receiver on a $k^{th}$ frequency subcarrier, N(k) is received noise, and E is an expectation operator.

18. The apparatus of claim 16 wherein the adaptive weight controller chooses $V_c$ to be the eigenvector corresponding to the largest eigenvalue of the quantity $$R_{HK} = \frac{1}{K}\sum_{k=1}^{K} H^H(k)H(k)$$

where

H(k) is a matrix channel response between a transmitter and a receiver for a $k^{th}$ frequency subcarrier.

19. The apparatus of claim 16 wherein each of the plurality of frequency subcarriers are transmitted on a different frequency.

* * * * *